United States Patent [19]

Regutti

[11] Patent Number: 5,077,070

[45] Date of Patent: Dec. 31, 1991

[54] METHOD OF MAKING A COMPOSITE FILTER MATERIAL AND ITS USE IN TREATING EDIBLE OILS

[75] Inventor: Robert Regutti, Geneva, Ill.

[73] Assignee: GyCor International, Ltd., Bridgeview, Ill.

[21] Appl. No.: 376,756

[22] Filed: Jul. 7, 1989

[51] Int. Cl.[5] .................................... A23D 9/02

[52] U.S. Cl. .................................... 426/417; 210/503; 426/271; 426/285; 426/423

[58] Field of Search ............... 426/417, 271, 285, 423; 210/282, 284, 353, 500.1, 503

[56] References Cited

U.S. PATENT DOCUMENTS

| | | | |
|---|---|---|---|
| 2,441,923 | 5/1948 | Sullivan | 426/417 |
| 2,454,937 | 11/1948 | Moyer et al. | 426/417 |
| 3,231,390 | 1/1966 | Hoover | 426/417 |
| 3,947,602 | 3/1976 | Clewell, Jr. et al. | 426/417 |
| 4,112,129 | 9/1978 | Duensing et al. | 426/417 |
| 4,235,795 | 11/1980 | Cohen | 426/417 |
| 4,243,428 | 1/1981 | Donnet et al. | 106/492 |
| 4,288,462 | 9/1981 | Hou et al. | 426/423 |
| 4,330,564 | 5/1982 | Friedman | 426/423 |
| 4,349,451 | 9/1982 | Friedman | 426/271 |
| 4,613,578 | 9/1986 | Hertzenberg | 502/64 |
| 4,681,768 | 7/1987 | Mulflur et al. | 426/417 |
| 4,734,226 | 3/1988 | Parker et al. | 426/417 |
| 4,735,815 | 4/1988 | Taylor et al. | 426/417 |
| 4,764,384 | 8/1988 | Gyann | 426/417 |
| 4,880,652 | 11/1989 | Regutti | 426/417 |

*Primary Examiner*—Donald E. Czaja
*Assistant Examiner*—D. Workman
*Attorney, Agent, or Firm*—Marshall A. Burmeister

[57] ABSTRACT

A substantially dry filtering media for rejuvenating glyceride oils is formed by admixing a calcined metallic oxide and an expanded silicate in a tumbler having grounded, electrically conducting walls for a period of time to electrostatically produce an agglomerate. Specific examples of metallic oxides are calcined magnesium oxide, calcined aluminum oxide, calcined potassium oxide, calcined calcium oxide, calcined zinc oxide and calcined ferric oxide. Examples of the silicate are expanded perlite and expanded pumice. The agglomerate so formed is of sufficient size to facilitate filtering of the oil, and subsequent removal of the media from the rejuvenated oil.

14 Claims, No Drawings

METHOD OF MAKING A COMPOSITE FILTER MATERIAL AND ITS USE IN TREATING EDIBLE OILS

INTRODUCTION

The present invention relates to use of a particulate composite filter material consisting essentially of an activated metal oxide and a silicate for refining glyceride oil, particularly such oil containing contaminants resulting from the cooking of food. In addition, the present invention relates to methods of making that composition.

BACKGROUND OF THE INVENTION

Edible oils have been refined from ancient times, but with a few exceptions these efforts have centered on animal fats and oils. Serious efforts to refine vegetable oils, such as soybean, cottonseed, or palm oil, have been made in this century, and products of this type are now freely available. An early process for treating raw edible oils of this type is disclosed in U.S. Pat. No. 2,441,923 of Francis M. Sullivan and utilizes heat treatment followed by deodorizing.

More complex processes for treating raw edible glyceride oils have been developed more recently as described in U.S. Pat. No. 4,150,045 to Rabindra K. Sinha entitled MgO IMPREGNATED ACTIVATED CARBON AND ITS USE IN AN IMPROVED VEGETABLE OIL REFINING PROCESS. This patent describes the refining processes of the prior art as applied to raw vegetable oil as consisting of degumming, alkali neutralization, water washing, bleaching, and deodorizing performed in that order.

The contaminants of raw glyceride oil and the contaminants of used cooking oil are generally different due to introduction into the cooking oil of food juices and particles and the effects of oxidation on the oil, but there are some common contaminants, such as fatty acids. In the refining of raw glyceride oil, the fatty acids combine with metallic ions from the processing equipment to form soap, and soap also is produced in cooking oil by the cooking process as a result of the combination of fatty acids and metallic ions from the cooker. An increase in the concentration of free fatty acids in glyceride oil, or the production of significant amounts of soap, is considered to be a precursor of rancidity in the oil.

The art has several methods of treating used cooking oil, all of which have the effect of reducing the production of soap in used cooking oil. U.S. Pat. No. 4,764,384 of John Gyann entitled METHOD OF FILTERING SPENT COOKING OIL adsorbs free fatty acids by treating used cooking oil with a composition of silicates including a hydrated amorphous silica gel, thereby reducing the combination of free fatty acids and metallic ions and the resulting soap. Another approach to controlling the concentration of free fatty acids by adsorption is described in U.S. Pat. No. 4,235,795 of Cohen, and this approach admixes pumicite with used cooking oil as an adsorbent for free fatty acids. A second method of treating used cooking oil is described in U.S. Pat. No. 4,330,564 of Friedman in which a chelating agent is admixed with the cooking oil to tie up the metal ions and prevent the combination of free fatty acids and metal ions and the resulting production of soap. A third method of treating used cooking oil is described in U.S. Pat. No. 3,231,390 of Hoover in which used cooking oil is treated with an adsorbent consisting of an alkaline earth metal carbonate or an alkaline earth metal oxide, and the adsorbent is removed from the oil by filtration. It is believed that the process of Hoover is a saponification process which removes the metallic ions as soap in the filtration step.

While removal of soap from spent cooking oil is an important consideration in restoring the usefulness of the oil and increasing the useful life of the oil in the cooking process, there are other contaminants in the used cooking oil which should preferably be removed. By practicing the present invention, phospholipids, peroxides, crumbs and food fragments, and other impurities, as well as fatty acids and soap, are removed from the used cooking oil.

SUMMARY OF THE INVENTION

The present invention is an improvement on the process of Hoover U.S. Pat. No. 3,231,390 in that the used cooking oil is treated with a metal oxide. The present invention employs the saponification process to free sufficient fatty acids in the used cooking oil for combining with the available metallic ions to form soap. In accordance with the present invention, the soap is thereafter absorbed or adsorbed by a filter media formed of a silicate and a metal oxide, and the filter media of metal oxide and silicate is thereafter removed from the used cooking oil.

Also according to the present invention, the metal oxide and silicate are attached to each other in the form of an agglomerate, and the inventor has found that agglomeration of a metal oxide with a silicate can be achieved by intimately admixing the ingredients over a period of time.

A preferred composition for treating used cooking oil is an agglomeration of magnesium oxide and perlite with a suitable particulate size for filtering. The magnesium oxide must be activated, and the magnesium oxide is calcined before admixing with the perlite for this purpose. Also, the perlite is preferably expanded in a manner well known in the art before being combined with the calcined magnesium oxide.

In accordance with the present invention, the magnesium oxide and perlite are agglomerated by intimately dry mixing the composition for a sufficient period of time to cause the magnesium oxide and perlite to be electrostatically attracted to each other. The agglomerated mixture may then be admixed with the used cooking oil, maintained within the oil a sufficient period of time to convert the metallic ions in the used cooking oil to soap and to adsorb and/or absorb the soap in the perlite/magnesium oxide agglomerate, and thereafter the agglomerate and soap are removed by filtration.

Activated magnesium oxide adsorbs fatty acids, keytones, aldehydes, and the like, while expanded perlite is effective in adsorbing submicron sized oil degredation products from used cooking oil. A filter material containing both activated magnesium oxide and expanded perlite is thus more effective than one employing either ingredient alone.

DETAILED DESCRIPTION OF THE INVENTION

While the preferred metal oxide for use in the filter media is calcined and activated magnesium oxide, others may be used, such as calcium oxide and aluminum oxide. Magnesium oxide is substantially inert in the absence of activation, and magnesium oxide may be activated by heating the material to a temperature above 1600° Fahrenheit for a period of about one hour. This process of activation, also called calcining, also hardens the material and reduces the solubility of the material in oil at cooking temperatures, i.e., temperatures up to about 400° Fahrenheit.

Also moisture may be used in the activation step, as disclosed U.S. Pat. No. 2,454,937 of Moyer and Marmor entitled PROCESS OF TREATING GLYCERIDE OILS WITH ACTIVATED MAGNESIUM OXIDE. Moisture is also employed in the process of expanding certain silicas, such as perlite. Heating perlite in the presence of moisture causes the perlite to expand and creates fissures in the surface, and the fissures in the granular materials are highly desirable for adsorption of contaminants in cooking oil or the like.

It is conventional practice in the fast food industry to periodically remove the cooking fat from the deep fat fryers and filter particles from the cooking fat. This process is usually conducted daily at the end of the day, and it generally includes pouring the cooking fat into a vessel through a layer of filter paper. A filter media, such as known to the prior art and described above, may be placed on the paper filter to form a bed for the removal of contaminants, or the filter media may be directly added to the cooking oil in the cooker and thereafter removed by filtration through a paper filter. In either event, the porosity of the filter media will affect the flow rate of the cooking oil through the filter paper.

The agglomerated material of the present invention is intended for use in the manner of the prior art described above, and accordingly must be of a particle size sufficient to permit filtration in a reasonable time. The particle size of most compositions of metal oxides described above are too fine to produce normal filtration rates. In accordance with the present invention, the granulated oxides are agglomerated with a silica to achieve suitable particle size to achieve normal filtration rates.

Agglomeration is achieved by treating the metal oxide in granular form with a granular silica in the presence of little or no moisture in a mixer. The mixer is preferably in the form of a tumbler. Both the metal oxide granules and the silica granules are poor electrical conductors, and the friction of the metal oxide particles slidably engaging the silica particles removes electrons from one of the particles and adds the electron to the other particle. It is believed that silica particles loose electrons and the metal oxide particles gain electrons. Since the metal oxide particles and the silica particles become charged, and to opposite potentials, the electrostatic attraction of opposite charges causes the metal oxide particles to become bound to the silica particles forming an agglomerate. The size of the agglomerate is significantly greater than the particle size of the individual particles, particularly since more than one of the smaller metal oxide particles may become attached to a larger silica particle, and vice versa, thus achieving an agglomerate filter media which produces faster filtration rates.

In a preferred process, a mixture is formed of 70% calcined magnesium oxide, to 30% expanded perlite by weight, both magnesium oxide and perlite being commercially available products. The magnesium oxide particles and perlite particles are substantially dry, that is contain less than 4% moisture by weight. The particle size of the magnesium oxide is −80 grade from Harcros Chemicals, Inc. The expanded perlite is significantly larger and is F-5 graded from filter Media Co. Sufficient activated magnesium oxide and expanded perlite was poured into a tumbler to form 454 grams of this mixture. The tumbler has electrically conducting metal walls, and the walls are grounded. The tumbler was actuated and tumbled the mixture for 20 minutes, a sufficient period of time for the mixture to agglomerate. Experience indicates that a period of tumbling of about 15 to 20 minutes is required to achieve agglomeration.

The agglomerated filter material was added directly to the used cooking oil in a conventional 10 quart cooker of a fast food restaurant operating at a temperature of 375° Fahrenheit in the ratio of 1 part of filter material to 20 parts of cooking oil by weight. The filter material was permitted to mix with the cooking oil by convection currents in the oil without stirring. After the lapse of three minutes, the used cooking oil and entrained filter material was drained from the cooker and filtered through a filter paper on a funnel. It was found that the slurry of used cooking oil and agglomerated filter material filtered without clogging the filter, and all of the used cooking oil passed through the filter paper in a five minute period leaving the filter material disposed on the filter paper.

Visual and taste tests show that the used cooking oil was greatly improved in both color and taste. The free fatty acid and soap content of the used cooking oil was materially reduced materially and it is believed that other contaminants were removed from the oil.

The agglomeration of metal oxide and silicate results in greater adsorption or absorption of contaminants from the used cooking oil than can be achieved by use of the metal oxide alone. This is particularly true of the agglomerate of activated or calcined magnesium oxide and expanded perlite. The surfaces of expanded perlite has fissures capable of trapping large gumm molecules (soap) and oxidized oil/degradation compounds (i.e., dienes, trienes, other polymers) and sub-micron particles (burnt food), and hence the intimate association of the perlite and magnesium oxide particles tends to combine the pores and fissures of the two particles. Thus, the intimately associated expanded perlite and calcined magnesium oxide offer large contact areas for the attachment of large particles such as the soaps produced by the magnesium oxide through the saponification process.

Those skilled in the art will recognize other and additional applications for the present invention and many additional methods and compositions within the concept of the present invention. It is intended therefore that the scope of the present invention be not limited by the foregoing specification, but only by the appended claims.

I claim:

1. The method of treating a glyceride oil containing contaminants comprising the steps of admixing a filter media comprising a plurality of agglomerates with the glyceride oil, each agglomerate comprising granules of calcined metal oxide and silicate, the granules of metal oxide being electrostatically bound to the granules of silicate to form a clump, thereafter maintaining the clumps of filter media in contact with the oil for a period of time sufficient for the media to absorb at least a portion of the contaminants, and thereafter removing the clumps of filter media from the treated oil.

2. The method of treating glyceride oil containing contaminants comprising the steps of claim 1 wherein the calcined metal oxide is calcined magnesium oxide.

3. The method of treating glyceride oil containing contaminants comprising the steps of claim 1 wherein the silicate is expanded perlite.

4. The method of treating glyceride oil containing contaminants comprising the steps of claim 1 wherein the silicate is expanded pumicite.

5. The method of treating a glyceride oil containing contaminants comprising the steps of dry mixing powdered calcined metallic oxide and particles of expanded silicate to produce an intimately blended composition in which the calcined metallic oxide particles are electrostatically bound to the particulate silicate to form a plurality of clumps, admixing the clumps with the glyceride oil, thereafter maintaining the clumps in contact with the oil for a period of time sufficient for the composition to absorb at least a portion of the contaminants, and thereafter removing the clumps from the treated oil.

6. The method of treating glyceride oil containing contaminants comprising the steps of claim 5 wherein the granulated silicate consists of expanded perlite, and the expanded perlite comprises between 20% and 70% of the metallic oxide by weight.

7. An agglomerated filter material useful in the treatment of glyceride oil comprising a plurality of clumps of suitable size for filtering glyceride oil, each clump having a first plurality of particles consisting essentially of calcined metal oxide, and a second plurality of particles consisting essentially of a silicate, the particles being essentially dry and particles of the first plurality being electrostatically bound to particles of the second plurality.

8. An agglomerate filter material useful in the treatment of glyceride oil comprising the combination of claim 7 wherein the first plurality of particles are of the class consisting of calcined aluminum oxide, calcined calcium oxide, calcined potassium oxide, calcined zinc oxide, calcined ferric oxide, and calcined magnesium oxide.

9. An agglomerate filter material useful in the treatment of glyceride oil comprising the combination of claim 7 wherein the second plurality of particles are of the class consisting of expanded perlite, rhyolite, pumice, volcanic ash, and silica gel.

10. An agglomerate filter material useful in the treatment of glyceride oil comprising the combination of claim 7 wherein the first plurality of particles consist essentially of calcined magnesium oxide, and the second plurality of particles consist essentially of expanded perlite, the moisture content of the fist and second plurality of particles being less than 4% by weight of the total mass.

11. An agglomerate filter material useful in the treatment of glyceride oil comprising the combination of claim 7 wherein the first plurality of particles consist essentially of calcined aluminum oxide.

12. An agglomerate filter material useful in the treatment of glyceride oil comprising the combination of claim 7 wherein the first plurality of particles consist essentially of magnesium oxide, and the second plurality of particles consist essentially of pumicite.

13. The method of making an agglomerate filter material comprising the steps of selecting a first plurality of essentially dry particles of a compound comprising a calcined metal oxide, selecting a second plurality of essentially dry particles of an expanded silicate, thereafter admixing the first plurality and the second plurality of particles in a vessel, and thereafter continuously agitating the particles in said vessel for a period of time sufficient to generate a static electrical charge between the first plurality of particles and the second plurality of particles, whereby the particles bind together to form clumps.

14. The method of making an agglomerate filter material comprising the steps of claim 13, the step of selecting the first plurality of particles selecting calcined magnesium oxide particles with a moisture content less than 4% by weight, and the step of selecting the second plurality of particles selecting expanded perlite with a moisture content less than 4% by weight.

* * * * *